United States Patent
Benedict et al.

(10) Patent No.: US 9,534,817 B2
(45) Date of Patent: Jan. 3, 2017

(54) CONDUCTION BASED MAGNETO CALORIC HEAT PUMP

(71) Applicant: General Electric Company, Schenectady, NY (US)

(72) Inventors: Michael Alexander Benedict, Louisville, KY (US); Francis Johnson, Clifton Park, NY (US); Vijay Kumar Srivastava, Schenectady, NY (US); Chiranjeev Kalra, Glenville, NY (US)

(73) Assignee: General Electric Company, Schenectady, NY (US)

( * ) Notice: Subject to any disclaimer, the term of this patent is extended or adjusted under 35 U.S.C. 154(b) by 694 days.

(21) Appl. No.: 13/853,316

(22) Filed: Mar. 29, 2013

(65) Prior Publication Data

US 2014/0290273 A1    Oct. 2, 2014

(51) Int. Cl.
F25B 21/00    (2006.01)

(52) U.S. Cl.
CPC .......... *F25B 21/00* (2013.01); *F25B 2321/002* (2013.01); *F25B 2321/0023* (2013.01); *Y02B 30/66* (2013.01)

(58) Field of Classification Search
CPC .......... F25B 21/00; F25B 13/00; Y02B 30/66
USPC .................... 62/3.1, 324.1; 252/67
See application file for complete search history.

(56) References Cited

U.S. PATENT DOCUMENTS

| 668,560 | A | 2/1901 | Fulner et al. |
|---|---|---|---|
| 4,107,935 | A | 8/1978 | Steyert, Jr. |
| 4,507,927 | A | 4/1985 | Barclay |
| 4,549,155 | A | 10/1985 | Halbach |
| 4,625,519 | A | 12/1986 | Hakuraku et al. |
| 4,642,994 | A | 2/1987 | Barclay et al. |
| 5,091,361 | A | 2/1992 | Hed |
| 6,446,441 | B1 | 9/2002 | Dean |
| 6,588,215 | B1 | 7/2003 | Ghoshal |
| 6,668,560 | B2 | 12/2003 | Zimm et al. |
| 6,935,121 | B2 | 8/2005 | Fang et al. |
| 7,552,592 | B2 | 6/2009 | Iwasaki et al. |
| 7,897,898 | B2 | 3/2011 | Muller et al. |

(Continued)

FOREIGN PATENT DOCUMENTS

| CN | 101979937 | 2/2011 |
|---|---|---|
| EP | 2108904 A1 | 10/2009 |

(Continued)

OTHER PUBLICATIONS

International Search Report and Written Opinion issued connection with PCT Application No. PCT/US2014/017431 dated May 16, 2014.

(Continued)

*Primary Examiner* — Melvin Jones
(74) *Attorney, Agent, or Firm* — Dority & Manning, P.A.

(57) ABSTRACT

A heat pump is provided that uses multiple stages of MCMs to cause heat transfer between a heat receiving end and a heat transmitting end. Thermal blocks are placed along the direction of heat transfer at locations in the heat pump that preclude the transfer of heat in a direction from the heat transmitting end towards the heat receiving end. The heat pump can be, for example, part of a refrigeration loop or can be connected directly with the object for which heating or cooling is desired. An appliance incorporating such a heat pump is also provided.

19 Claims, 5 Drawing Sheets

(56) References Cited

U.S. PATENT DOCUMENTS

| | | | |
|---|---|---|---|
| 8,209,988 | B2 | 7/2012 | Zhang et al. |
| 8,375,727 | B2 | 2/2013 | Sohn |
| 8,695,354 | B2 | 4/2014 | Heitzler et al. |
| 2008/0303375 | A1* | 12/2008 | Carver .................. 310/306 |
| 2009/0301541 | A1* | 12/2009 | Watts .................. 136/205 |
| 2010/0071383 | A1 | 3/2010 | Zhang et al. |
| 2010/0175392 | A1* | 7/2010 | Malloy et al. .................. 62/3.2 |
| 2011/0146308 | A1* | 6/2011 | Casasanta .................. 62/113 |
| 2011/0173993 | A1 | 7/2011 | Muller et al. |
| 2011/0182086 | A1 | 7/2011 | Mienko et al. |
| 2011/0239662 | A1 | 10/2011 | Bahl et al. |
| 2011/0308258 | A1 | 12/2011 | Smith et al. |
| 2012/0079834 | A1 | 4/2012 | Dinesen |
| 2012/0222427 | A1 | 9/2012 | Hassen |
| 2012/0267090 | A1 | 10/2012 | Kruglick |
| 2012/0285179 | A1 | 11/2012 | Morimoto |
| 2013/0019610 | A1 | 1/2013 | Zimm et al. |
| 2013/0187077 | A1 | 7/2013 | Katter |
| 2014/0190182 | A1 | 7/2014 | Benedict |

FOREIGN PATENT DOCUMENTS

| | | |
|---|---|---|
| JP | 2002315243 A | 10/2002 |
| JP | 2007147136 | 6/2007 |
| JP | 2007/291437 A | 11/2007 |
| JP | 2008051412 | 3/2008 |
| WO | WO 02/12800 | 2/2002 |
| WO | 03016794 | 2/2003 |
| WO | 2011/034594 A1 | 3/2011 |

OTHER PUBLICATIONS

International Search Report and Written Opinion issued in connection with PCT Application No. PCT/US2014/042485 dated Oct. 31, 2014.

International Search Report and Written Opinion issued in connection with PCT Application No. PCT/US2014/017431 dated May 16, 2014.

International Search Report issued in connection with PCT/US2014/070518, dated Jan. 30, 2014.

Tetsuji Okamura, Performance of a room-temperature rotary magnet refrigerator, Nov. 28, 2005, Elsevier.

* cited by examiner

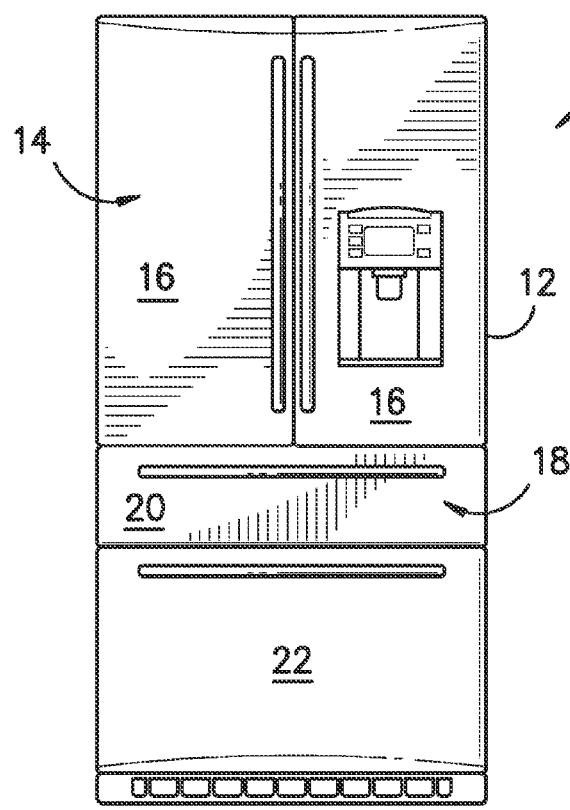
FIG. -1-
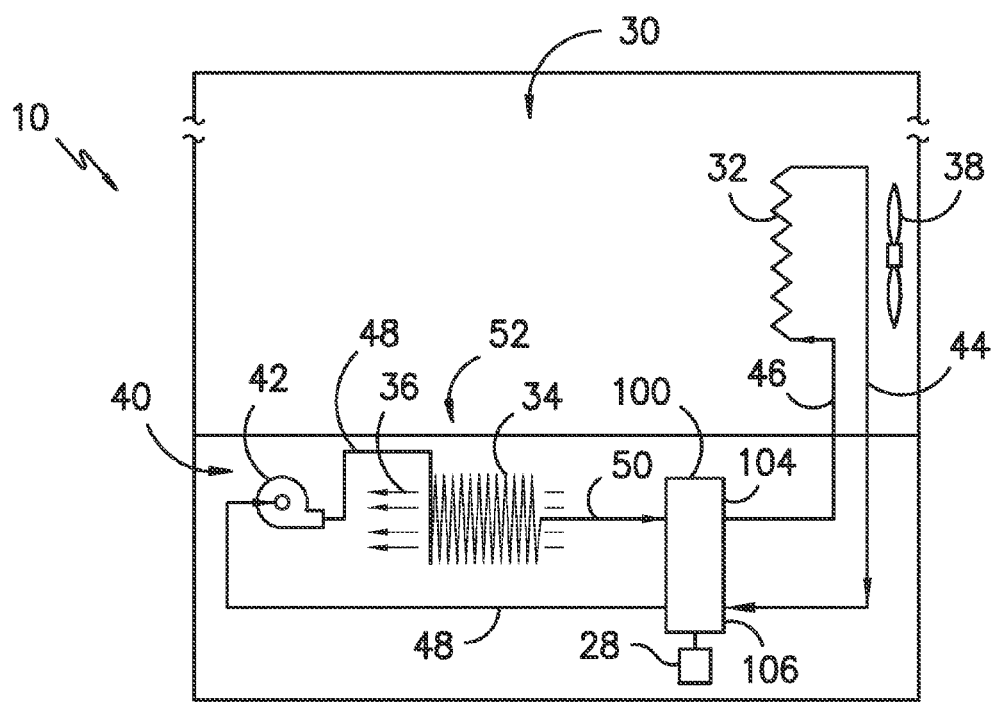
FIG. -2-

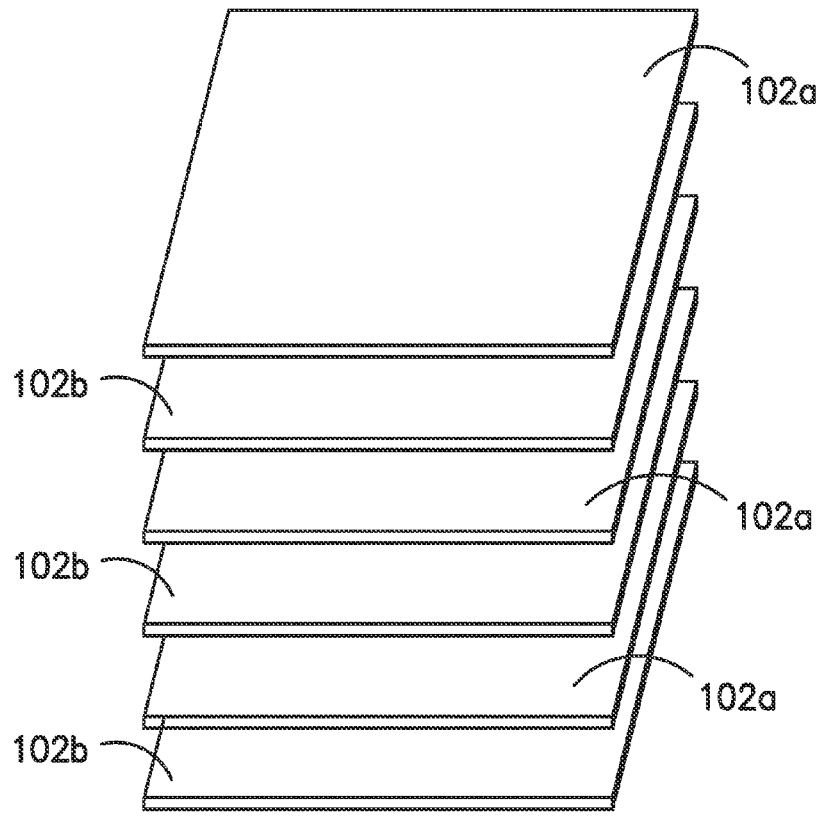
FIG. -3-
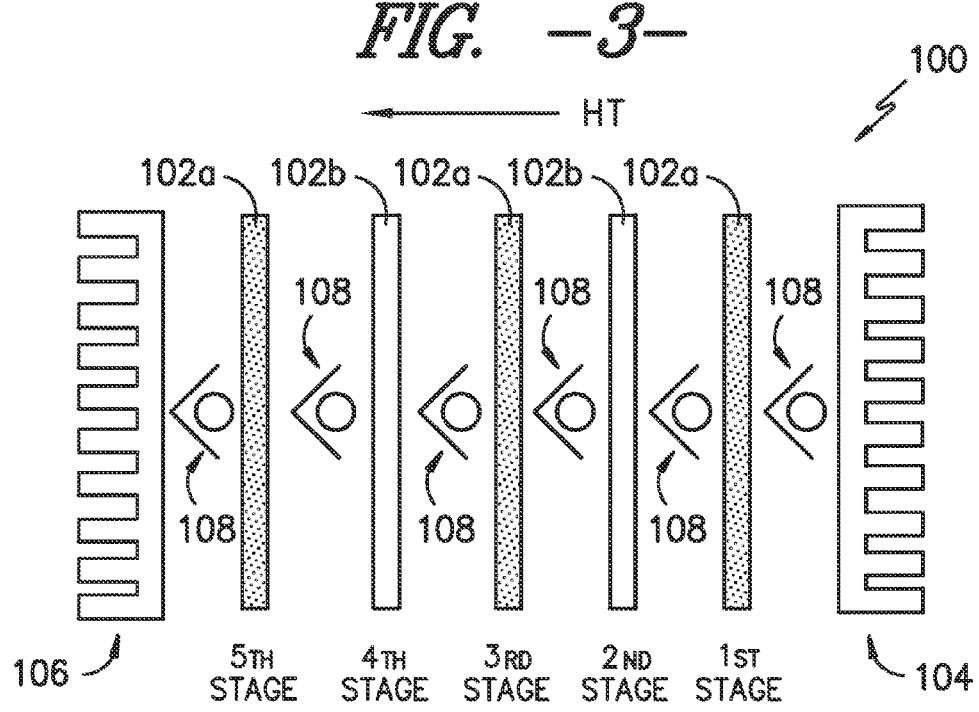
FIG. -4-

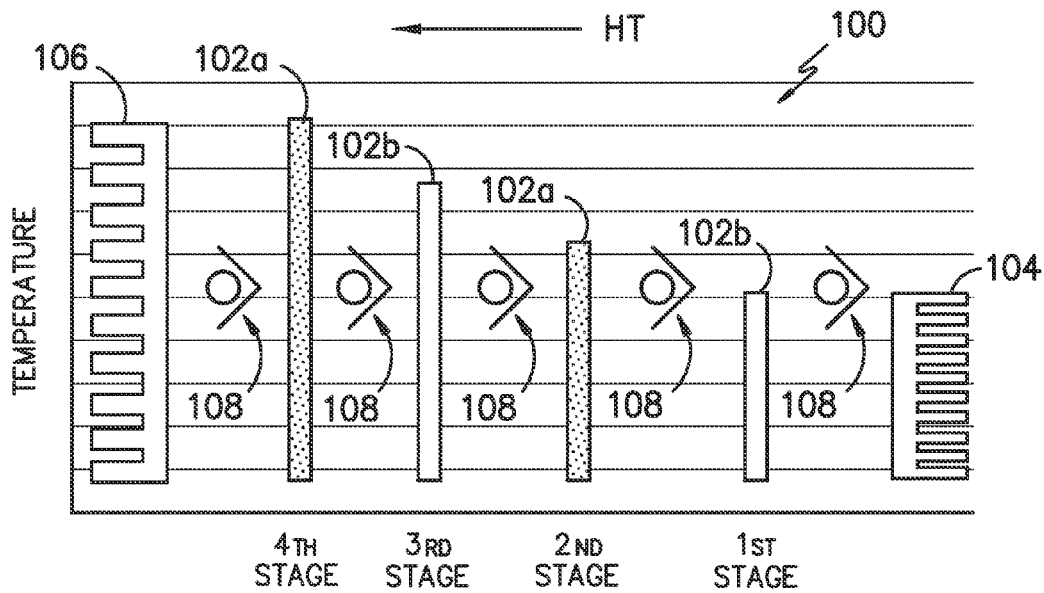
FIG. -5-
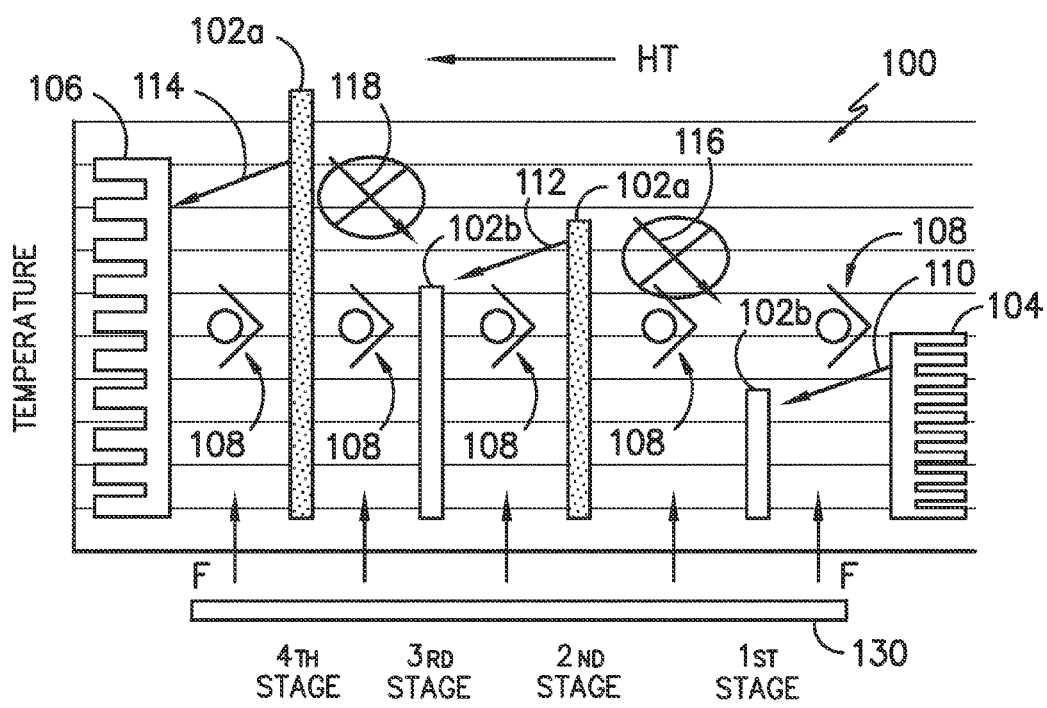
FIG. -6-

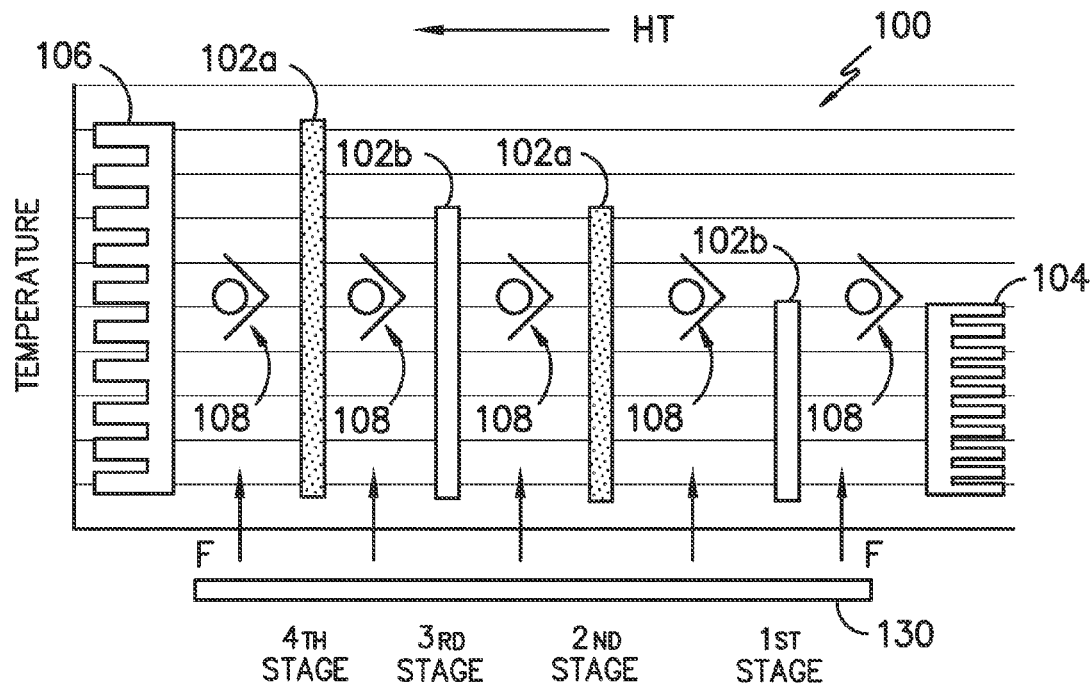
FIG. -7-
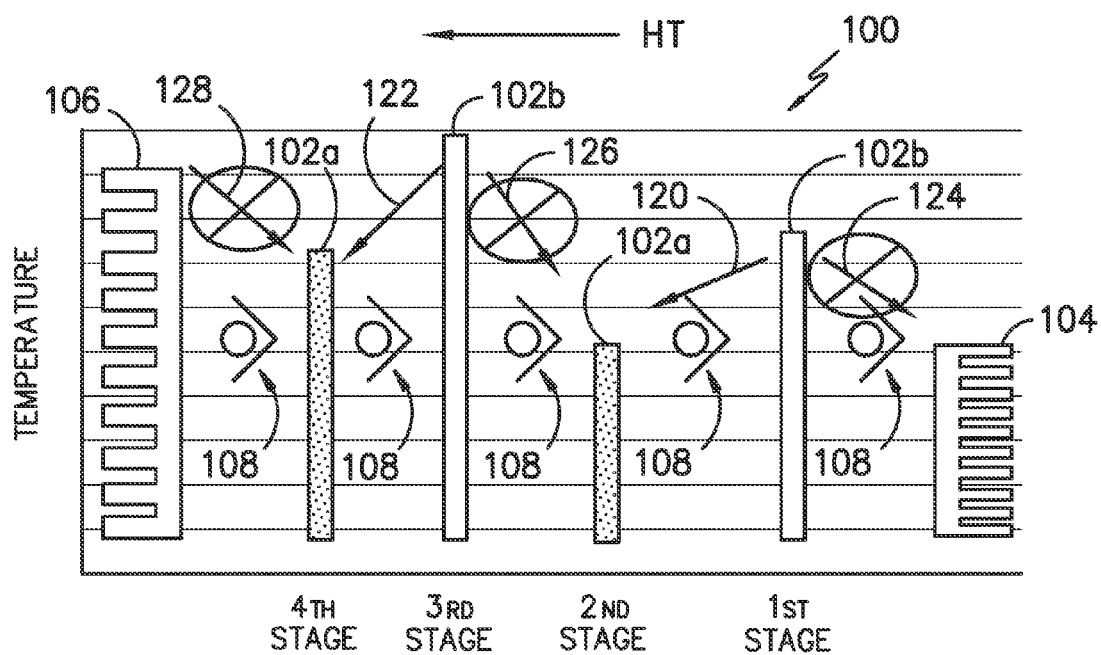
FIG. -8-

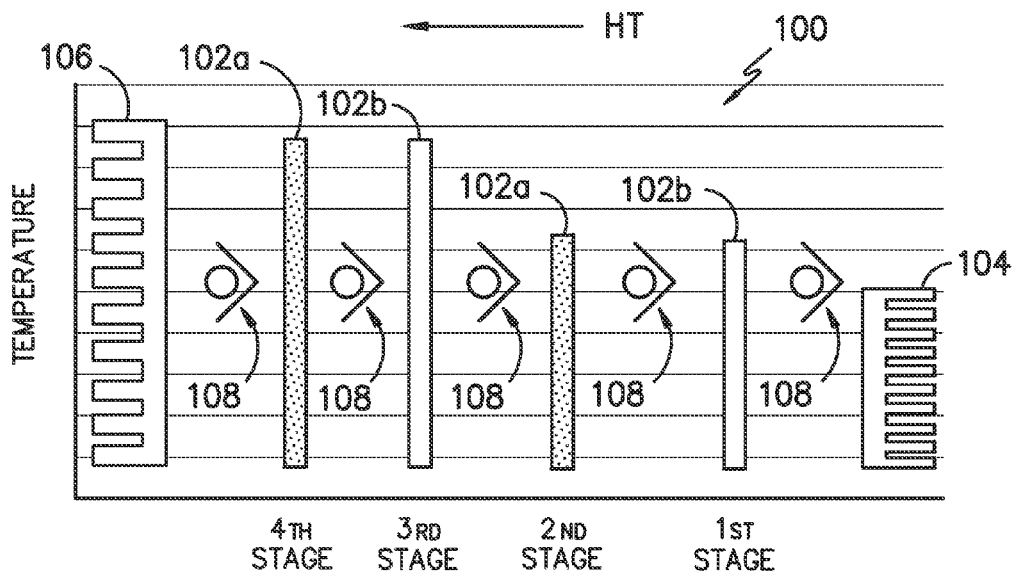
FIG. -9-
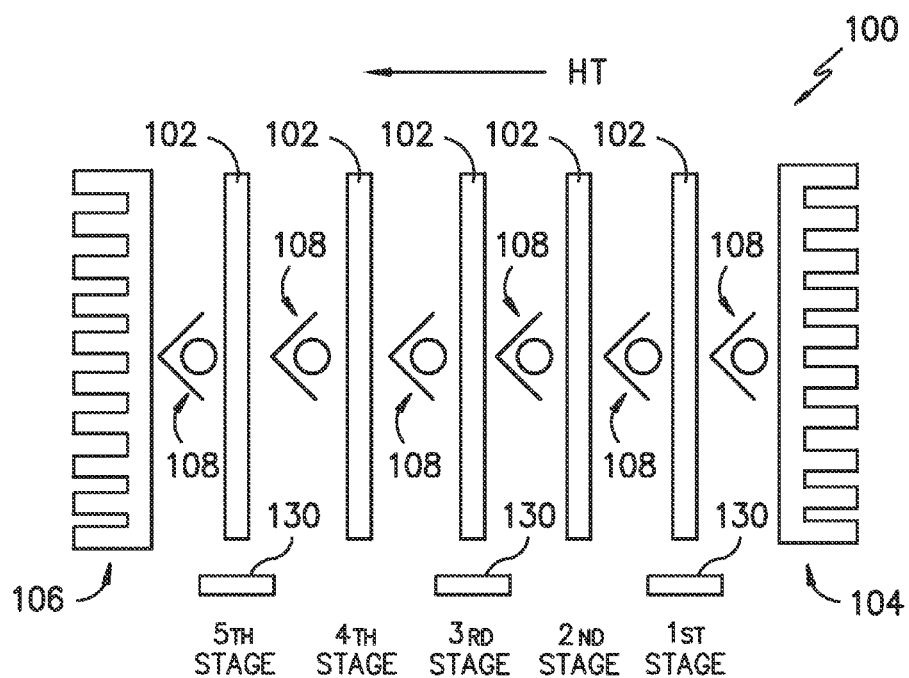
FIG. -10-

CONDUCTION BASED MAGNETO CALORIC HEAT PUMP

FIELD OF THE INVENTION

The subject matter of the present disclosure relates generally to a heat pump that uses magneto caloric materials to provide for heating or cooling.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or i.e. transfer heat energy from one location to another. This cycle can be used to provide e.g., for the receiving of heat from a refrigeration compartment and the rejecting of such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about 45 percent or less of the maximum theoretical Carnot cycle efficiency. Also, some fluid refrigerants have been discontinued due to environmental concerns. The range of ambient temperatures over which certain refrigerant—based systems can operate may be impractical for certain locations. Other challenges with heat pumps that use a fluid refrigerant exist as well.

Magneto caloric materials (MCMs)—i.e. materials that exhibit the magneto caloric effect—provide a potential alternative to fluid refrigerants for heat pump applications. In general, and as used herein, the magnetic moments of a "normal" MCM will become more ordered under an increasing, externally applied magnetic field and cause the MCM to generate heat. Conversely, decreasing the externally applied magnetic field will allow the magnetic moments of the normal MCM to become more disordered and allow the normal MCM to absorb heat. Some MCMs exhibit the opposite behavior—i.e. generating heat when the magnetic field is removed—and such MCMs are referred to herein as para-magneto caloric or inverse MCMs. The theoretical Carnot cycle efficiency of a refrigeration cycle based on an MCM can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Provision should be made for the transfer or heat to and from the MCM, preferably in a continuous manner so that the equipment does not operate in a start and stop fashion that can be inefficient. Currently proposed equipment may require relatively large and expensive magnets, may be impractical for use in e.g., appliance refrigeration, and may not otherwise operate with enough efficiency to justify capital cost.

Additionally, as stated above, the ambient conditions under which a heat pump may be needed can vary substantially. For example, for a refrigerator appliance placed in a garage or located in a non-air conditioned space, ambient temperatures can range from below freezing to over 90° F. Some MCMs are capable of accepting and generating heat only within a much narrower temperature range than presented by such ambient conditions.

Accordingly, a heat pump or heat pump system that can address certain challenges such as those identified above would be useful. More particularly, such a heat pump that can effectively use MCMs would be particularly beneficial. Such a heat pump system that can also be used in e.g., a refrigerator appliance would also be useful.

BRIEF DESCRIPTION OF THE INVENTION

The present invention provides a heat pump that uses multiple stages of MCMs to provide for heat transfer between a heat receiving end and a heat transmitting end. Thermal blocks are placed along the direction of heat transfer at locations in the heat pump that preclude the transfer of heat in a direction from the heat transmitting end towards the heat receiving end. The heat pump can be, for example, part of a refrigeration loop or can be connected directly with the object for which heating or cooling is desired. An appliance incorporating such a heat pump is also provided. Additional aspects and advantages of the invention will be set forth in part in the following description, or may be apparent from the description, or may be learned through practice of the invention.

In one exemplary embodiment, the present invention provides a heat pump. The heat pump includes a plurality of stages arranged sequentially along a direction of heat transfer between a heat receiving end and a heat transmitting end. The plurality of stages alternate between a stage comprising a magneto caloric material and a stage comprising an inverse magneto caloric material. The heat pump includes a plurality of thermal blocks. At least one thermal block is positioned at the heat receiving end, at least one thermal block is positioned at the heat transmitting end, and at least one thermal block is positioned between each of the stages. Each thermal block is configured to preclude the transfer of heat in a direction from the heat transmitting end towards the heat receiving end. A magnetic element is configured to cycle a changing field of magnetic flux along the plurality of stages.

In another exemplary embodiment, the present invention includes a refrigerator appliance having one or more compartments for the storage of food items. A heat pump is provided that includes a heat receiving portion in thermal communication with the one or more compartments so as to receive heat from the compartment; a heat transmitting portion for releasing heat; a plurality of stages positioned adjacent to each other along a direction of heat transfer between the heat receiving portion and the heat transmitting portion; the plurality of stages alternating between one or more stages comprising a magneto caloric material and one or more stages comprising an inverse magneto caloric material; a plurality of thermal blocks, at least one block positioned between each pair of adjacent stages of the plurality of stages, at least one thermal block positioned downstream of the heat receiving portion, at least one thermal block positioned upstream of the heat transmitting portion, the plurality of thermal blocks configured to substantially block the transfer of heat in a direction from the heat transmitting portion towards the heat receiving portion; and a magnetic element configured to subject the plurality of stages to field of changing magnetic flux.

In still another exemplary embodiment, the present invention provides a heat pump that includes a plurality of stages arranged sequentially along a direction of heat transfer between a heat receiving end and a heat transmitting end. The plurality of stages alternate between a stage comprising a magneto caloric material and a stage comprising a thermally conductive metal. A plurality of thermal blocks are included wherein at least one thermal block is positioned at the heat receiving end, at least one thermal block is positioned at the heat transmitting end, and at least one thermal block is positioned between each of the stages. Each thermal block is configured to preclude the transfer of heat in a direction from the heat transmitting end towards the heat receiving end. A magnetic element is configured to cycle a changing field of magnetic flux along the plurality of stages.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides an exemplary embodiment of a refrigerator appliance of the present invention.

FIG. 2 is a schematic illustration of an exemplary heat pump system of the present invention positioned in an exemplary refrigerator with a machinery compartment and a refrigerated compartment.

FIG. 3 is a perspective view of a plurality of exemplary stages of the present invention.

FIG. 4 is a schematic side view of an exemplary heat pump of the present invention.

FIGS. 5-9 are schematic side views of an exemplary heat pump of the present invention superimposed onto a temperature chart as further described below.

FIG. 10 is a schematic side view of another exemplary heat pump of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an exemplary embodiment of an appliance refrigerator 10 is depicted as an upright refrigerator having a cabinet or casing 12 that defines a number of internal storage compartments or chilled chambers. In particular, refrigerator appliance 10 includes upper fresh food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present invention is not limited to appliances and may be used in other applications as well such as e.g., air-conditioning, electronics cooling devices, and others. Thus, it should be understood that while the use of a heat pump to provide cooling within a refrigerator is provided by way of example herein, the present invention may also be used to provide for other heating and/or cooling applications as well.

FIG. 2 is a schematic view of another exemplary embodiment of a refrigerator appliance 10 including a refrigeration compartment 30 and a machinery compartment 40. In particular, machinery compartment 30 includes a heat pump system or loop 52 having a first heat exchanger 32 positioned in the refrigeration compartment 30 for the removal of heat therefrom. A heat transfer fluid such as e.g., an aqueous solution, flowing within first heat exchanger 32 receives heat from the refrigeration compartment 30 thereby cooling its contents. A fan 38 may be used to provide for a flow of air across first heat exchanger 32 to improve the rate of heat transfer from the refrigeration compartment 30.

The heat transfer fluid flows out of first heat exchanger 32 by line 44 to heat pump 100. As will be further described herein, the heat transfer fluid receives additional heat from heat transmitting portion 106 of heat pump 100 and carries this heat by line 48 to pump 42 and then to second heat exchanger 34. Heat is released to the environment, machinery compartment 40, and/or other location(s) external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 100 as will be further described.

From second heat exchanger 34 the heat transfer fluid returns by line 50 to heat pump 100 where, as will be further described below, the heat transfer fluid loses heat to the heat receiving portion of heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system or loop 52 may be used as well. For example, lines 44, 46, 48, and 50 provide fluid communication between the various components of the heat pump system 52 but other heat transfer fluid recirculation loops with different lines and connections may also be employed. For example, pump 42 can also be positioned at other locations or on other lines in system 52. Still other configurations of heat pump system 52 may be used as well.

Referring now to FIGS. 3 and 4, heat pump 100 includes a plurality of layers or stages 102 of MCM. More particularly, a plurality of stages 102 are arranged or positioned adjacent to each other in a manner that is sequential along a direction of heat transfer as depicted by arrow HT. Stages 102 are located between a heat receiving end or portion 104 and a heat transmitting end or portion 106. Heat is transferred primarily by conduction between heat receiving end 104 and heat transmitting end 106. Heat is transferred to heat pump 100 at the heat receiving end 104 whereas heat is rejected from heat pump 100 at the heat transmitting end 106.

For example, heat receiving end 104 can be placed into thermal communication with one or more compartments in refrigerator 10 while the heat transmitting end 106 can be placed into thermal communication with the environment or a system whereby heat may be delivered to the environment. Alternatively, heat transmitting end 106 could be placed into thermal communication with a device, compartment, etc. intended for heating with heat pump 102 while heat receiving end 104 is placed in thermal communication with a heat source.

For this exemplary embodiment, each stage 102 is constructed as a planar sheet or thin layer of MCM. Stages 102 can be e.g., a collection of particles arranged into a layer or may be constructed as a flat plate of MCM. The thin layer construction for each stage 102 provides a large surface area for heat transfer by conduction along the heat transfer direction HT. Additionally, other shapes for stage 102 can also be used to increase the area of stage 102 available for heat transfer along direction HT. For example, stage 102 could be corrugated so as to increase its heat transfer area without substantially increasing its thickness.

Stages 102 are arranged in an alternating fashion between a stage 102a constructed from a normal MCM and a stage 102b constructed from an inverse MCM. For this exemplary embodiment, the first stage (1st) 102a in the direction of heat transfer is constructed from a normal MCM and a total of 5 stages overall are employed. However, in other embodiments of the invention, the first stage 102 could be constructed from an inverse MCM and a different number of stages can be employed. Any number of stages may be employed depending upon the overall amount of heating or cooling desired from heat pump 100 and e.g., the range of temperature over which the MCM (normal or inverse) in each stage 102 exhibits the desired magneto caloric response to provide such heating or cooling (referred to herein as the "Curie temperature range").

The Curie temperature ranges of stages 102 are selected to overlap in order to facilitate heat transfer along direction HT. For example, in the embodiment shown in FIG. 4, the first stage 102a could have a Curie temperature range of 20° C. to 10° C.; the second stage 102b could have a Curie temperature range of 17.5° C. to 7.5° C.; the third stage 102a could have a Curie temperature range of 15° C. to 5° C.; the fourth stage 102b could have a Curie temperature range of 12.5° C. to 2.5° C.; and the fifth stage 102a could have a Curie temperature range of 10° C. to 0° C. These ranges are provided as examples; other Curie temperature ranges may be used as well in still other exemplary embodiments of the invention.

At least one thermal block 108 is positioned between each stage 102. At least one thermal block 108 is positioned downstream of heat receiving end 104 and upstream of the first stage 102. At least one thermal block 108 is positioned upstream of heat transmitting end 106 and downstream of fifth stage 102.

Each thermal block 108 precludes the transfer of heat in a direction opposite to direction HT along heat pump 100. More particularly, thermal block 108 precludes the transfer of heat along heat pump 100 in a direction from the heat transmitting end 106 towards the heat receiving end 104. As used herein, "precludes" means that thermal block 108 eliminates or substantially reduces the transfer of heat in a direction from heat transmitting end 106 to heat receiving end 104 during operation of heat pump 100 such that heat pump 100 can cause the transfer of heat along direction HT.

Different constructions can be used for thermal block 108. In one construction, thermal block 108 is a thermal diode such as that described in U.S. Pat. Pub. 2008/0012804 to Chen et al., the contents of which are incorporated herein by reference. In still another exemplary embodiment, thermal block 108 is a thermal switch such as that described in Advances in Cryogenic Engineering: Transactions of the Cryogenic Engineering Conference -CEC, Vol. 49A, ed. J. Waynert et al. pp. 436-442 (2004, American Institute of Physics), the contents of which are incorporated herein by reference.

For purposes of further description of the invention, a schematic illustration of another exemplary heat pump 100 of the present invention is shown in FIG. 5 superimposed on a chart where the y-axis represents temperature, the x-axis is parallel to the desired direction HT of heat transfer along stages 102, and the height along the y-axis of different elements of heat pump 100 is used to represent the temperature of each such element. Also, in FIG. 5, heat pump 100 is depicted with four stages 102 in operation and each stage 102 is at a temperature centered within its Curie temperature range. As such, heat is transferred along direction HT from heat receiving end 104, sequentially though each of the first, second, third, and fourth stages 102, and then to heat transmitting end 106.

In a first step of a heat pump cycle for heat pump 100 as depicted in FIG. 6, a magnetic element 130 is positioned so as to subject stages 102 to a field of magnetic flux F and, more particularly, to increase the magnetic flux F along the plurality of stages 102. As a result, the temperatures of first stage 102b and third stage 102b are decreased because these stages are constructed from an inverse MCM. Conversely, the temperatures of second stage 102a and fourth stage 102a are increased because these stages are constructed from a normal MCM.

In this condition, heat receiving end 104 is at a higher temperature than first stage 102b, which causes heat to transfer along direction HT from heat receiving end 104 to first stage 102b as depicted by arrow 110. As a result, heat receiving end 104 is cooled and is, therefore, able to remove more heat from e.g., appliance 10.

At the same time, the temperature of second stage 102a is higher than third stage 102b. Thus, heat is transferred from second 102a to third stage 102b as depicted by arrow 112. Notably, however, heat is precluded from transferring between second stage 102a and first stage 102b due to the presence of a thermal block 108 therebetween as depicted by the blocked arrow 116.

Similarly, the temperature of fourth stage 102a is higher than the temperature of heat transmitting end 106. Thus, heat transfers along direction HT from fourth stage 102a to heat transmitting end 106 as depicted by arrow 114. As a result, heat transmitting end is warmed and, therefore, can be used to reject heat to the environment or to provide desired heating. However, heat is precluded from transferring from the warmer fourth stage 102a to the cooler third stage 102b by the presence of a thermal block 108 therebetween as depicted by blocked arrow 118.

As depicted in FIG. 7, if an infinite amount of time is allowed after magnetic element 130 is positioned so as to increase the magnetic flux across stages 102, an equilibrium condition is eventually reached where the temperature of first stage 102b and heat receiving end 104 are the same. Similarly, the temperatures of second stage 102a and third stage 102b eventually equilibrate as will fourth stage 102a and heat transmitting end 106. In practice, the logarithmic decay of heat transfer between various elements of heat pump 100 will require that some shorter period of time is used such that e.g., the optimum amount of heat transfer is allowed based upon the operating requirements of heat pump 100. This can be determined e.g., by controlling the frequency at which magnetic element 130 subjects stages 102 to changes in magnetic flux.

Next, in FIG. 8, magnetic element 130 is removed so as to reduce or eliminate the field of magnetic flux along the plurality of elements 102. Accordingly, this causes the second stage 102a and fourth stage 102a to decrease in temperature as these are constructed from a normal MCM. Conversely, first stage 102b and third stage 102b increase in temperature as these are constructed from an inverse MCM.

As a result, heat from first stage 102b is transferred to second stage 102a as depicted by arrow 120 but is blocked by a thermal diode 108 from transferring to heat receiving end 104 as depicted by blocked arrow 124. Heat from third stage 102b is transferred to fourth stage 102a as depicted by arrow 122 but is blocked from transferring to second stage 102a as depicted by blocked arrow 126. Finally, although the temperature of heat transmitting end 106 is greater than fourth stage 102a, heat is precluded against transferring from heat transmitting end 106 to fourth stage 102a by a thermal diode 108 located therebetween.

As depicted in FIG. 9, if an infinite amount of time is allowed after magnetic element 130 is removed so as to decrease the field of magnetic flux, an equilibrium condition is eventually reached. In such condition, the temperatures of first stage 102b and second 102a are the same, and the temperatures of third stage 102b and fourth stage 102a are the same. Again, because of the time associated with reaching complete thermal equilibrium, a shorter time can be used within the performance requirements needed for heat pump 100 by e.g., configuring magnetic element 130 to cycle the field of magnetic flux at an appropriate frequency. To restart the cycle depicted in FIGS. 4 through 9, magnetic element 130 can be positioned again as shown in FIG. 6.

Accordingly, heat pump 100 can be used to pump heat from end 104 in the direction of end 106. By way of example, heat receiving end 104 could be placed in direct thermal communication with one of the compartments of appliance 10. Heat receiving end 104 could be placed directly into such compartment with e.g., a fan blowing air in the compartment over end 104. Similarly, heat transmitting end 106 can be positioned outside of the appliance with e.g., a fan to blow ambient air over end 106.

Still other configurations may be used as well. Referring again to FIG. 2, heat pump loop 52 can be configured to circulate a fluid such as e.g., a saline or other aqueous solution so as to provide heat transfer between ends 104 and 106 of heat pump 100. A motor 28 is used to move a magnetic element 130 relative to stages 102 so as to provide a cyclic, changing field of magnetic flux over stages 102 at an appropriate frequency as previously described. Other configurations of loop 52 may be used.

FIG. 10 provides a schematic illustration of still another exemplary embodiment of the present invention. For this embodiment, each stage 102 is made of a normal MCM or, alternatively, each stage 102 is made of an inverse MCM. In order to cause heat to flow by conduction along direction HT, stages 102 are cyclically magnetized in an alternative manner. For example, in FIG. 10, only the first, third, and fifth stages 102 are subjected to an increased field of magnetic flux using magnetic elements 130. In another step of the cycle, only the second and fourth stages 102 are subjected to an increased field of magnetic flux using magnetic elements 130. In this way, heat transfer along direction between stages 102 can be induced as will be understood by one of skill in the art using the teachings disclosed herein.

Returning to FIG. 4, in still another exemplary heat pump 100 of the present invention, stages 102 could be alternated between non-active stages of a high thermal conductivity metal and either a normal MCM or an inverse MCM. For example, in FIG. 4 stages 102a could be constructed from a normal MCM while stages 102b could be constructed from aluminum. Alternatively, stages 102a could be constructed from an inverse MCM while stages 102b could be constructed from aluminum. In each case, stages 102a would have overlapping Curie temperature ranges as previously described. During cycles of increasing and decreasing magnetic fields, stages 102b would act as a passive heat storage stage while stages 102a would provide heating or cooling depending upon the type of MCM used. Thermal blocks 108 would ensure that heat flows along direction HT.

For each of the above embodiments, a variety of constructions can be used for magnetic element 130. For example, magnetic element 130 can be constructed from one or more magnets. In such case, a mechanism can be employed to move the magnet relative to stages 102 to provide for a changing field of magnetic flux. Alternatively, magnetic element 130 could be constructed from one or more electromagnets connected with a power source that can be configured to selectively energize the electromagnets. In still another alternative, a combination of magnets and electromagnets could be applied.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat pump, comprising:
a plurality of stages arranged sequentially along a direction of heat transfer between a heat receiving end and a heat transmitting end, the plurality of stages alternating between a stage comprising a normal magneto caloric material and a stage comprising an inverse magneto caloric material;
a plurality of thermal blocks, wherein at least one thermal block is positioned at the heat receiving end, at least one thermal block is positioned at the heat transmitting end, and at least one thermal block is positioned between each of the stages, wherein each thermal block is configured to preclude the transfer of heat in a direction from the heat transmitting end towards the heat receiving end; and
a magnetic element configured to cycle a changing field of magnetic flux along the plurality of stages.

2. A heat pump as in claim 1, wherein each thermal block comprises a thermal diode.

3. A heat pump as in claim 1, wherein each thermal block comprises a thermal switch.

4. A heat pump as in claim 1, wherein one or more of the stages has a Curie temperature range that is greater than a Curie temperature range for an adjacent stage along the direction of heat transfer.

5. A heat pump as in claim 1, wherein each stage comprises a planar sheet.

6. A heat pump as in claim 1, wherein each stage comprises a plurality of particles.

7. A heat pump as in claim 1, wherein the magnetic element comprises a magnet.

8. A heat pump as in claim 1, wherein the magnetic element comprises:
an electromagnet; and
a power source operatively connected with the electromagnet to create the changing field of magnetic flux.

9. A heat pump as in claim 1, wherein the at least one thermal block comprises a plurality of thermal blocks, each thermal block positioned between at least two of the plurality of stages.

10. A refrigerator appliance comprising the heat pump of claim 1.

11. A refrigerator appliance, comprising:
a compartment for the storage of food items;
a heat pump comprising
a heat receiving portion in thermal communication with the compartment so as to receive heat from the compartment;
a heat transmitting portion for releasing heat;
a plurality of stages positioned adjacent to each other along a direction of heat transfer between the heat receiving portion and the heat transmitting portion; the plurality of stages alternating between one or more stages comprising a normal magneto caloric material and one or more stages comprising an inverse magneto caloric material;
a plurality of thermal blocks, at least one block positioned between each pair of adjacent stages of the plurality of stages, at least one thermal block positioned downstream of the heat receiving portion, at least one thermal block positioned upstream of the heat transmitting portion, the plurality of thermal blocks configured to substantially block the transfer of heat in a direction from the heat transmitting portion towards the heat receiving portion; and
a magnetic element configured to subject the plurality of stages to field of changing magnetic flux.

12. A refrigerator appliance as in claim 11, wherein each thermal block comprises a thermal diode.

13. A refrigerator appliance as in claim 12, wherein the thermal block comprises a thermal switch.

14. A refrigerator appliance as in claim 11, wherein one or more of the stages has a Curie temperature range that is greater than a Curie temperature range for an adjacent stage along the direction of heat transfer.

15. A refrigerator appliance as in claim 11, wherein each stage comprises a planar sheet.

16. A refrigerator appliance as in claim 11, wherein each stage comprises a plurality of particles.

17. A refrigerator appliance as in claim 11, wherein the magnetic element comprises a magnet.

18. A heat pump, comprising:
a plurality of stages arranged sequentially along a direction of heat transfer between a heat receiving end and a heat transmitting end, the plurality of stages alternating between a stage comprising a magneto caloric material and a stage comprising a thermally conductive metal;
a plurality of thermal blocks, wherein at least one thermal block is positioned at the heat receiving end, at least one thermal block is positioned at the heat transmitting end, and at least one thermal block is positioned between each of the stages, wherein each thermal block is configured to preclude the transfer of heat in a direction from the heat transmitting end towards the heat receiving end; and
a magnetic element configured to cycle a changing field of magnetic flux along the plurality of stages.

19. A heat pump as in claim 18, wherein the magneto caloric material comprises a normal magneto caloric material.

* * * * *